United States Patent [19]
Malmin

[11] 3,855,705
[45] Dec. 24, 1974

[54] ENDODONTIC OPERATING SYSTEM

[76] Inventor: Oscar Malmin, 127 E. Wayne Ave., Akron, Ohio 44301

[22] Filed: June 11, 1973

[21] Appl. No.: 368,513

Related U.S. Application Data

[63] Continuation of Ser. No. 165,923, July 26, 1971, Pat. No. 3,772,791.

[52] U.S. Cl. .................................... 32/40 R, 32/57
[51] Int. Cl. ............................................... A61c 3/00
[58] Field of Search ........................ 32/57, 58, 40 R

[56] References Cited
UNITED STATES PATENTS

| | | | |
|---|---|---|---|
| 3,358,826 | 12/1967 | Siegel | 32/40 |
| 3,781,996 | 1/1974 | Saffro | 32/57 |

*Primary Examiner*—Robert Peshock
*Attorney, Agent, or Firm*—Freeman & Taylor

[57] ABSTRACT

An endodontic operating system which includes a measurement instrument and a sleeve adapted to be secured thereto; a working instrument and a measurement sleeve adapted to be secured thereto; a multi-purpose forceps or pliers; means for attaching the measurement sleeve to the working tool in predetermined relationship therewith and an assembly holder for holding the components of the system. The measurement instrument and sleeve thereof enable the instrument to be inserted into the root canal of a tooth with the sleeve secured thereto whereby by means of X-ray a predetermined depth relationship can be determined. The working instrument and the measurement sleeve associated therewith of a new design and a further application to existing instruments enable that sleeve to be placed on the working instrument in such a fashion that the working instrument enters the tooth to the predetermined depth determined by the measurement instrument which further may serve as an operating handle for the working instrument. Securing of the sleeves to both the measuring and working instruments is accomplished by the multipliers or forceps. The assembly holder provides a place for storing these components as well as for means for securing the measurement sleeve to the working instrument in its predetermined relationship.

14 Claims, 22 Drawing Figures

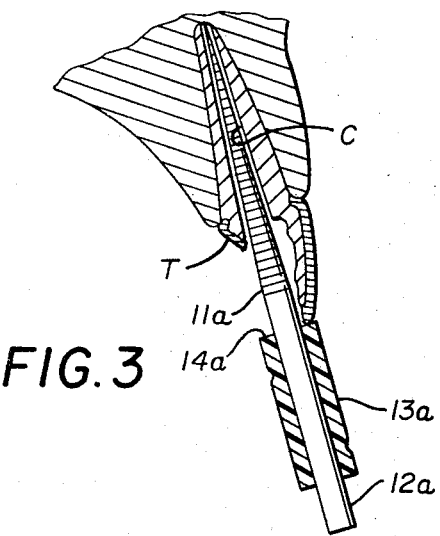
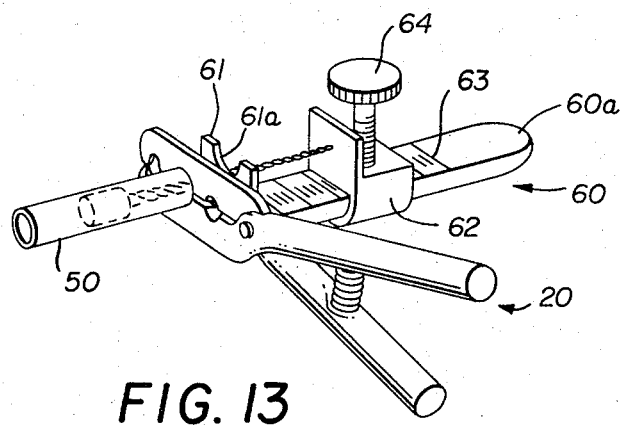
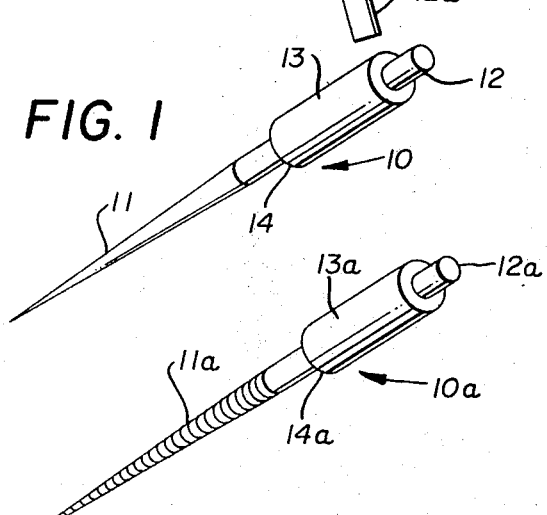
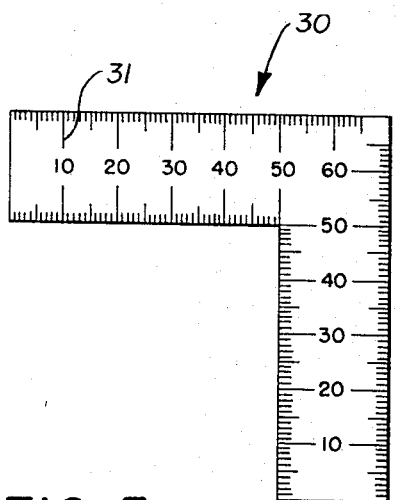
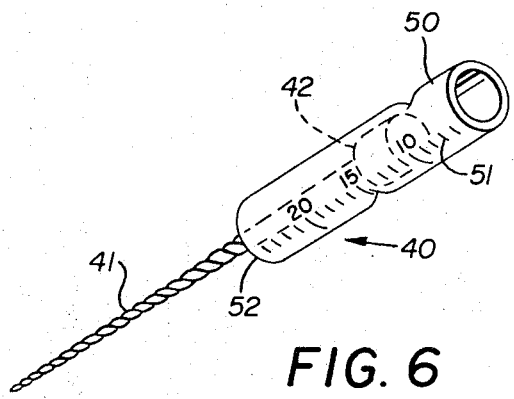
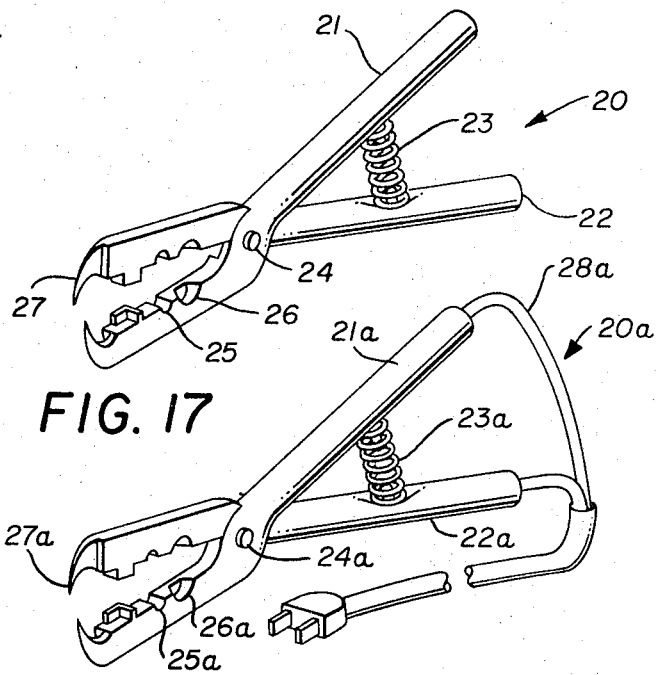

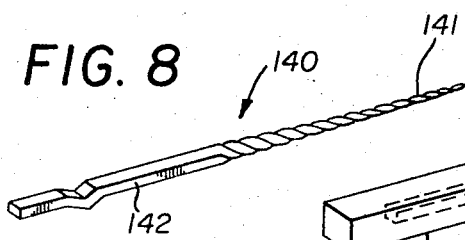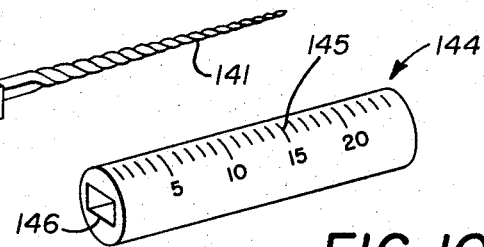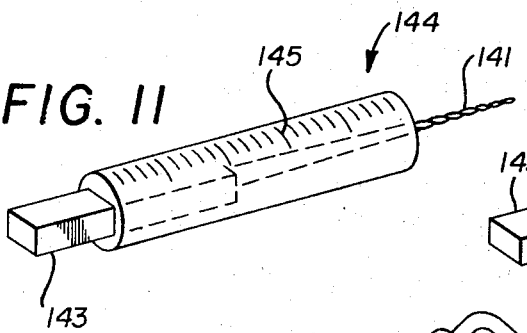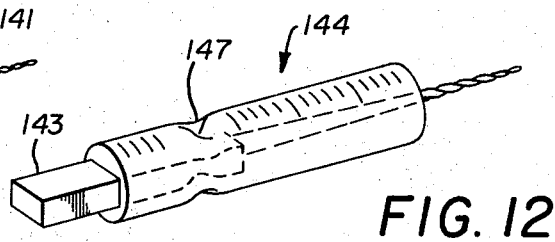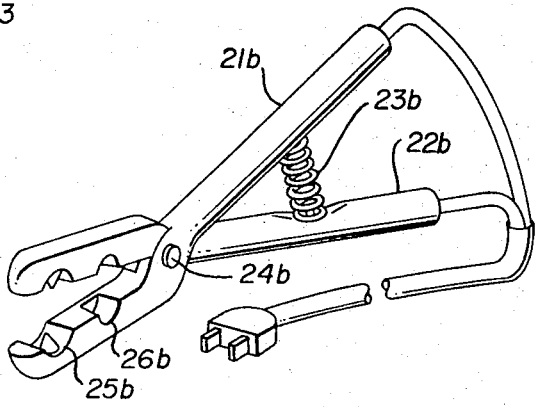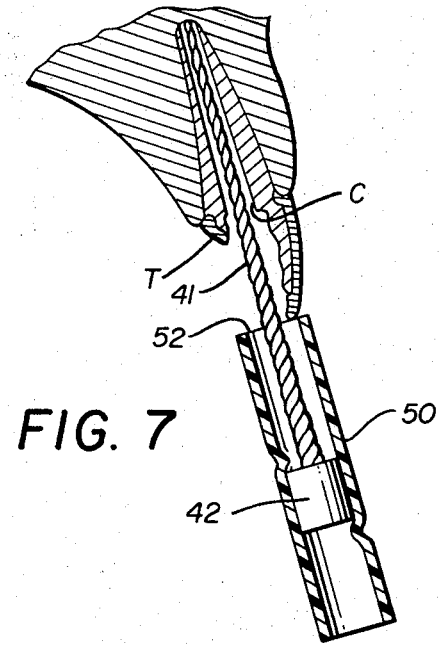

ENDODONTIC OPERATING SYSTEM

RELATED APPLICATIONS

This application is a continuation of applicant's earlier filed application, Ser. No. 165,923 filed July 26, 1971 and now U.S. Pat. No. 3,772,791 issued Nov. 20, 1973.

BACKGROUND OF THE INVENTION

This invention, in general, relates to an endodontic measurement system and, in particular, relates to a system which enables efficient, accurate and easy root canal work.

DESCRIPTION OF THE PRIOR ART

Several methods exist that attempt to accomplish the goal of efficient, accurate, and easy root canal preparation.

1. One method is the use of a Krueger Stop which is a metallic clip with an elongated arm having a bend (at its tip) with a hole located in the bend. A long-handled root canal instrument is slipped into the end of the clip, with the clip acting as the retentive means. The cutting portion of the root canal instrument projects through the hole in the bend to the selected distance desired.

This method has the limitations of the tip being flexible, the clip can slide, and only a long handle instrument may be used ruling out root canal on very nearly all teeth except the maxillary anterior (upper front) teeth.

2. Another method is the use of magnetized, hollow metal cylinders in varying lengths. By adding various combinations of these over the blade of the root canal instrument, only the desired length of blade is permitted to function.

This method has the limitations of being time-consuming in selecting the combinations, the pieces (though magnetized) are easily dislodged from the instrument, and, because the bore on all the pieces is the same, it does not work as well on the smallest diameter instruments and will not permit passage of the blade of the largest sizes.

3. Yet another method is the use of pre-sized plastic hubs with a through bore that snap over the end of the present form of root canal instruments. Since each hub is of a different size, one has to select the proper length hub to permit only the desired amount of working blade to be exposed for usage.

The disadvantages of this method are that the hubs are multi-length and multi-colored which leads to confusion. Mixing the hubs would result in much time loss and possible inaccuracy. The hubs are difficult to place and remove on the instrument.

4. The most common method is the use of an elastic or semi-rigid material in the form of small squares or circles.

The root canal instrument pierces the material, and the material is then moved up the blade to a distance permitting the usage of the desired working length of the instrument blade.

The disadvantages are that the material is movable and can therefore permit inaccuracy. The material is difficult to place in position.

SUMMARY OF THE INVENTION

At the present time, it is extremely difficult to obtain the necessary working lengths of instruments utilized in root canal surgery. The present systems are inaccurate, inefficient and inadequate.

It has been found that measurement can be accurately and easily determined by providing a flexible instrument of a sufficiently small diameter to fit into the root canal. It has been found that this instrument can be inserted to the desired depth following which a stop sleeve can be secured thereto, with the sleeve bottoming on a portion of the anatomical crown of the tooth. It has been found that if this is done, followed by an X-ray of the tooth, that due to the indicia on the measurement instrument, a precise measurement can be obtained.

It has also been discovered that by providing a working instrument of conventional construction together with a measurement sleeve having indicia thereon that the measurement sleeve can be secured to the shank or handle of the working instrument in such a fashion that upon insertion of the working instrument into the root canal, the measurement sleeve will also bottom on the crown of the tooth thereby obtaining the same depth of penetration with the working instrument as was obtained with the measurement instrument.

It has further been found that various forms of measurement sleeves can be provided, and that attachment of the sleevve to the measurement instrument can be provided and accomplished by means of a unique compression-type pliers or forceps.

Furthermore, supplemental means for precisely locating the measurement sleeve on the shank or handle of the working instrument can be provided to thereby eliminate the necessity of providing indicia on the measurement sleeve.

Additionally, it has been discovered that a new and unique assembly holder can be provided to provide a systematic and orderly storage vehicle contributing to efficient usage of the various components of the system.

It has further been found that if a new form of handle is made on the conventional root canal instrument blade, then an even more effective root canal instrument is created.

The handle of this form may be varied from a cylinder to a square or any variation in this geometric combination and may or may not possess indicia.

Using such a handle and a sleeve, with or without indicia, with a corresponding internal configuration to adapt to the handle, a more positive locking is assured in the form of compression, pinning or stapling, heat seal or chemical bonding.

Another advantage is that the total instrument is not reusable and must be discarded after its usage, thereby obeying the mechanical and biologic demands of root canal therapy.

A further advantage of this new handle form, since it could be made in a plastic material, is that excess length of the handle or sleeve can be easily snipped off using cutter blades incorporated in the design of the pliers or forceps. This would permit easy usage of the "stopped" or fixed measurement instrument on the posterior (back) teeth while maintaining all the advantages of the instrument form. While on the anterior (front) teeth, the excess handle length provides better mechanical control and leverage.

Accordingly, production of an endodontic operating system of the character described becomes the principal object of this invention, with other objects thereof becoming more apparent upon a reading of the following brief specification considered and interpreted in view of the drawings.

OF THE DRAWINGS:

FIG. 1 is a perspective view of one form of the measurement instrument.

FIG. 2 is a perspective view of a modified form of the measurement instrument.

FIG. 3 is a sectional view showing the measurement instrument inserted into the root canal with the sleeve being bottomed on the tooth crown.

FIG. 4 is a perspective view of one form of crimping pliers.

FIG. 5 is a plan view of a device for measuring the effective working distance on the measurement instrument.

FIG. 6 is a perspective view of one form of commonly used working instrument showing the measurement sleeve in place thereon.

FIG. 7 is a sectional view showing the working instrument inserted into the root canal with the measurement sleeve being bottomed on the tooth crown.

FIG. 8 is a perspective view of an improved form of working instrument.

FIG. 9 is a perspective view of an improved form of working instrument with the handle in place.

FIG. 10 is a perspective view of a measurement sleeve.

FIG. 11 is a perspective view of a working instrument showing the measurement sleeve in place.

FIG. 12 is a perspective view of the working instrument following crimping.

FIG. 13 is a perspective view showing one form of tool for securing the measurement sleeve to a working instrument.

FIGS. 17 and 18 are perspective views of modified forms of pliers for use with the invention.

DESCRIPTION OF THE PREFERRED EMBODIMENTS

A. The Measuring Instrument

Figure 14:
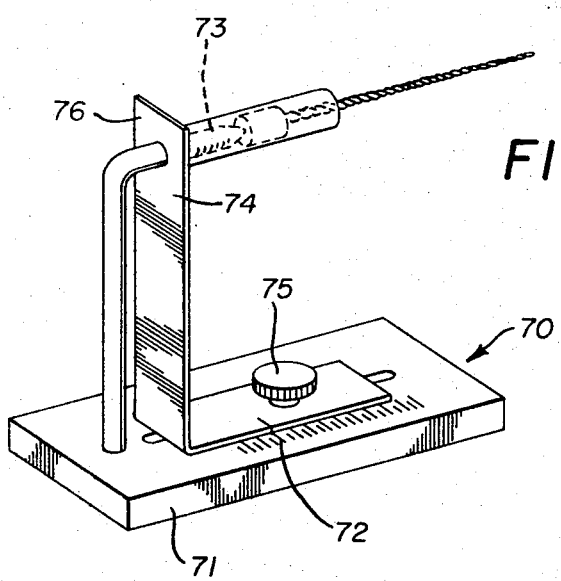
FIG. 14 is a perspective view of another tool for securing the measurement sleeve to a working instrument.
Figure 15:
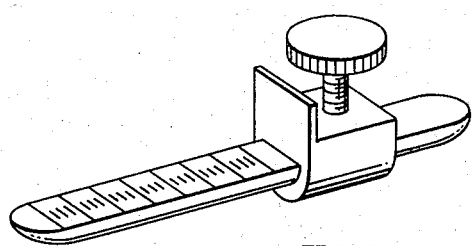
FIG. 15 is a perspective view of still another form of tool for securing the measurement sleeve to the working instrument.

Considering first FIGS. 1 through 5, the measuring instrument of the present invention comprises a tapered, preferably flexible, wire generally indicated by the numeral 10, with a diameter sufficiently small to permit it to be inserted into the root canal of a tooth. This wire has a tapered end 11 and a head or shank end 12. The measuring instrument also includes a hollow cylindrical sleeve 13.

It will be noted that FIGS. 1 and 2 show two variations of the measuring instrument, per se, with FIG. 1 showing the instrument having a smooth tapered end portion 11 while FIG. 2 shows an instrument 10a having a tapered portion 11a which has a series of annular rings thereon, preferably deep enough so that they will register on an X-ray film. The remainder of the instrument 10a is similar to instrument 10 in that it involves the tapered shank 11a, the head or shank end of the instrument 12a, and a sleeve 13a is also employed.

In use of the instrument, the measurement instrument 10 or 10a is first inserted into the root canal C of the tooth T as shown in FIG. 3. Sleeve 13 or 13a is slipped over the shaft or handle end 12 or 12a until the bottom of the sleeve bottoms on a portion of the crown of the tooth T, as clearly shown in FIG. 1.

Following this, the unique pliers or forceps of the invention 20, 20a, or 20b are utilized to crimp the sleeve to the handle end of the instrument.

These pliers or forceps 20, 20a, 20b are shown in FIGS. 4, 17, and 18, and include conventional handles 21, 22 21a, 22a, 21b, 22b and are interconnected by a spring 23, 23a, 23b. The handles 21, 22, 21a, 22a, 21b, 22b are pinned together as at 24, 24a, 24b and have operative jaws of unique design. One of the features of the jaw is a compression groove 25, 25a, 25b. Other features of the forceps or pliers will be described in greater detail below, but the above-noted characteristics are sufficient to explain the use of the pliers in conjunction with the measuring innstrument.

Accordingly and assuming that the measuring instrument has been inserted into the root canal and the sleeve has been slipped over it. the compression grooves of the pliers or forceps are used to deform the sleeve to lock it in place on the instrument thereby fixing the depth of insertion which has been obtained at that time.

Following this, an X-ray would be taken of the tooth. Depending upon the form of the invention utilized, the actual degree of penetration of the tapered shank 11, 11a of the measurement instrument can be ascertained. Thus, if the instrument 10 is utilized, a measurement can be made by utilization of the right-angled ruler 30 which is calibrated in millimeter graduations indicated by the numeral 31. In the form of the invention shown in FIG. 1, it is then a simple matter to measure the exposed length of the instrument with the ruler 30. This will give the distance between the bottom 14 of the sleeve 13 to the outboard end of the tip 11. If for any reason the tip of the instrument is short of or past the end of the root canal, the ruler 30 can again be utilized to ascertain the difference. This measurement can then, of course, either be added to or subtracted from the measured length of the exposed portion of the instrument 10 to obtain the desired measurement.

Ruler 30 is not necessary with instrument 10a since the annular ribs will provide a point of reference for determining the desired working length.

If for any reason the sleeve 13, 13a is excessive in length, the same may be cut off to a workable length by utilizing the cutting jaws or pockets 26, 26a, 26b on the pliers 20, 20a, 20b.

Additionally, it is generally contemplated that the measuring instrument could be produced together with its sleeve at a sufficiently low price so that it could be a disposable or throw-away type item. If, however, it is desired to re-use the basic measurement instrument, it would be possible to employ the slicing beaks 27, 27a of the pliers or forceps 20, 20a to cut off the sleeve 13, 13a, whereby the basic instrument can be sterilized and re-used.

B. The Working Instrument

Referring next then to FIGS. 6 through 19 for a description of the working instrument, it will be seen that the same is either a reamer, file, broach, or similar instrument, generally indicated by the numeral 40 in FIG. 6, and has a tapered outboard end 41 and a head member 42. Employed with the working instrument is a hollow, cylindrical sleeve 50 which is adapted to be telescopically received about the end 42 of the working instrument 40. It should be noted that FIG. 6 illustrates a conventional instrument, while FIGS. 8 through 12 show an improved and preferred instrument.

The sleeve 50 has a series of indicia 51 preferably graduated in millimeters on its outer surface, and it is believed possible, once the measurements obtained by utilization of the measuring instrument have been obtained as described above, that the sleeve could be telescoped over the working instrument 40 and, assuming that the instrument has a known fixed length, the sleeve could be telescoped over the instrument 40 until such time as the projecting or exposed portion of the instrument has a length from its tip to the bottom 52 of the sleeve corresponding to the dimension arrived at by utilization of the measuring instrument above-described. The various means for properly locating the sleeve will be described below.

Assuming for the moment that the sleeve has been properly positioned, at this time the pliers 20, 20a, 20b could again be utilized to crimp the sleeve in place. With regard to this crimping, it is preferable to crimp the sleeve both above and below the handle to avoid any possibility of rotation or movement between the sleeve and the instrument. In this fashion when the working instrument 40 is inserted into the root canal, as shown in FIG. 7, the bottom 52 of the sleeve 50 will bottom-out on the crown of the tooth so that in this fashion the depth of penetration of the reamer or file is assured to be precisely controlled in accordance with the previously ascertained desirable depth of penetration achieved and established by the measurement instrument.

It is also possible, of course, to cut off any projecting length of sleeve 50 which would be awkward to handle by utilizing the cutting areas 26, 26a, 26b of the pliers 20, 20a, 20b as described above.

It is also possible to recover the instrument itself, if desired, by utilizing the slicing tips 27, 27a of the pliers 20, 20a, again as described above in conjunction with the measurement instrument.

FIGS. 8 through 12 also show an alternative end preferred form of working instrument, generally indicated by the numeral 140.

In this form of the invention the working instrument, which is shown here as being a reamer, has a deformed handle portion 142 of rectangular cross section and a tapered portion 141. Received about the handle portion is a locating member 143 having a generally rectangular cross-sectional profile also. Although any cross section can be used, it is preferred to have at least one flat surface.

Employed with this form of working instrument is a hollow, cylindrical sleeve 144 having millimeter graduations 145 on its outer surface. The interior of the sleeve 144 is generally indicated by the numeral 146, and it is rectangular in cross-section to correspond with the cross-sectional configuration of the locating member 143.

FIGS. 11 and 12 show the method of assembly which includes slipping the sleeve over the locating member and the instrument and adjusting it to the desired axial position. Following this, the forceps or pliers may be employed to crimp both the locating member 143 and the sleeve 144 in place on the instrument 140.

It is also believed possible to secure these members together by other means which would be the mechanical equivalent of the crimping, such as for example by stapling or pinning, and it would also be possible to form a chemical union. Additionally the pliers can be wired as shown in FIGS. 4 and 18, and the components could be fused together.

Alternative methods of establishing the relative axial position of the sleeve on the working instrument are shown in FIGS. 13 through 16 and 19. The jigs shown in these figures are primarily used with unmarked sleeves.

Thus, and considering FIG. 13 first, it will be seen that a basically L-shaped measurement member 60 is provided, with this device having a cradle or flange 61 projecting upwards at one end thereof and also has a slide member 62 telescoped over it. The top surface 60a of the measuring member has s series of graduations 62 thereon, and the telescoping member 63 can be slid along the body of the element 60 and locked in place at the desired position by means of the set screw 64.

In utilizing this method of establishing the exposed length of the working instrument, it is merely necessary to set the movable member 62 at the predetermined length. Following this, the sleeve 50 is slipped over the working instrument 40, and the instrument is laid in the arcuate cutout area 61a of the flange 61. The sleeve 50 is then slid up against the flange 61 and crimped in place as previously described. Here again the exposed or extended portion of the working instrument is controlled as to length.

FIG. 14 shows a modified form of the invention for establishing the exposed length of the instrument 40, and is generally indicated by the numeral 70.

This unit includes a base member 71 with graduations 72 thereon. Projecting upwardly is a right-angled L-shaped member 76 which has a projecting end 73 and a stop plate 74. Stop plate 74 is movable along the base 71 and can be locked in place by the screw 75. In this form of the invention the desired length of extension of the working instrument is known, and the bracket 74 is adjusted to the desired position and locked in place. Following this, the hollow sleeve is slipped over the projection 73 and again crimped in place on the working instrument. Again the length of extension beyond the bottom edge of the sleeve is fixed.

Figure 16:
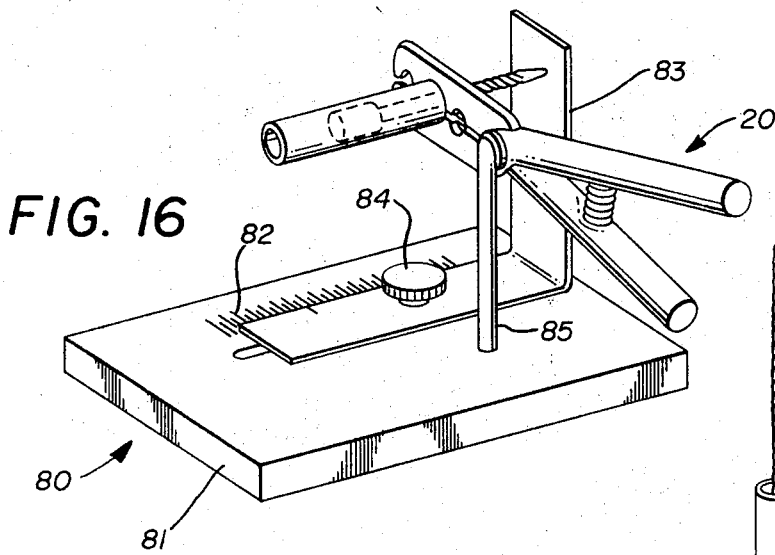
FIG. 16 is still further modified means for fitting the sleeve with regard to a working instrument.

FIG. 16 shows another form of the invention generally indicated by the numeral 80. In this form of the invention the base 81 has a series of graduations 82 thereon and has a right angle bracket 83 which is slidable along the top of the base 81 and capable of being locked in place by the screw 84. Also, in this form of the invention the pliers 20 are permanently mounted on the base 81 or standard 85, and in operation the bracket 83 is moved to the desired position, following which the working instrument and the sleeve are placed loosely in the jaws of the wrench 20 until the tip of the working instrument strikes the face of the plate 83. At this time the pliers are activated to crimp the sleeve in place on the working instrument.

Figure 19:
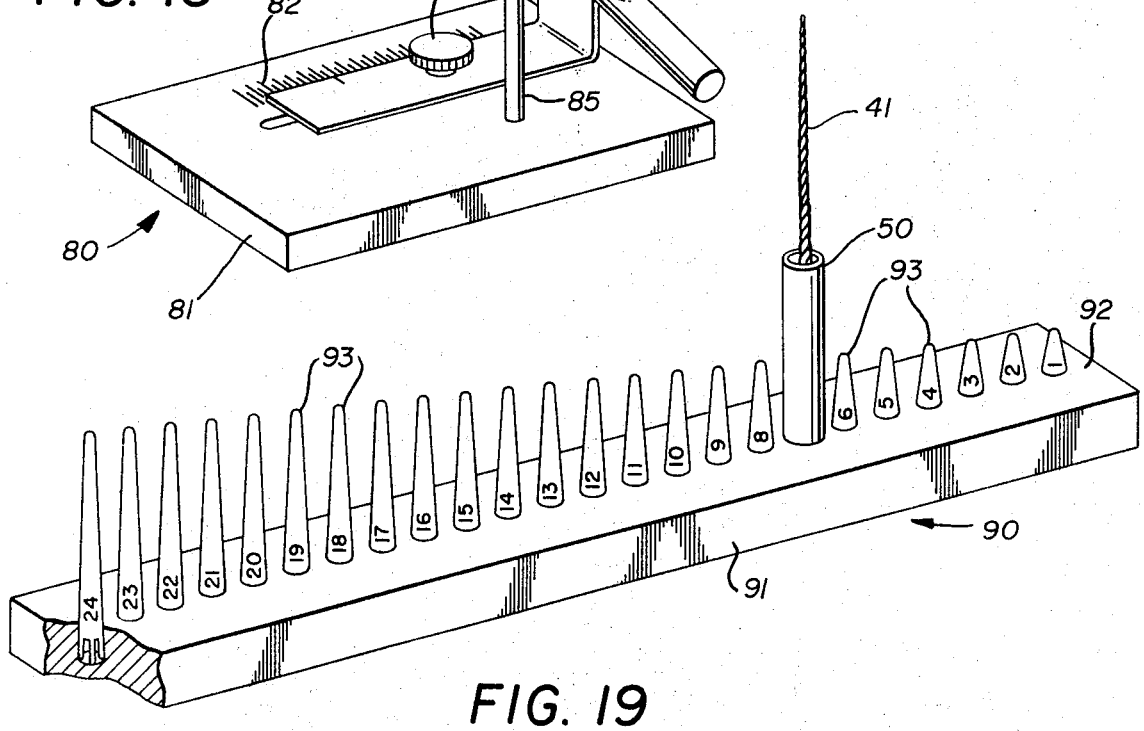
FIG. 19 is a perspective view partially broken away showning another means for fitting the measurement sleeve on the working instrument.

FIG. 19 shows yet another manner of affixing the sleeve to the working instrument so that it has a predetermined projection. In this form of the invention a base member 91 is provided having a series of pins 93, 93 mounted in its top surface 92. These pins are mounted so as to provide a progression of predetermined standard lengths. It is possible in this form of the invention to simply drop the sleeve and the working instrument over the projecting pins 93, with the selection of a particular pin being dictated by the predetermined length mentioned above. In this fashion it is possible again to obtain the desired length of projection following crimping.

C. The Assembly Holder

Figure 20:
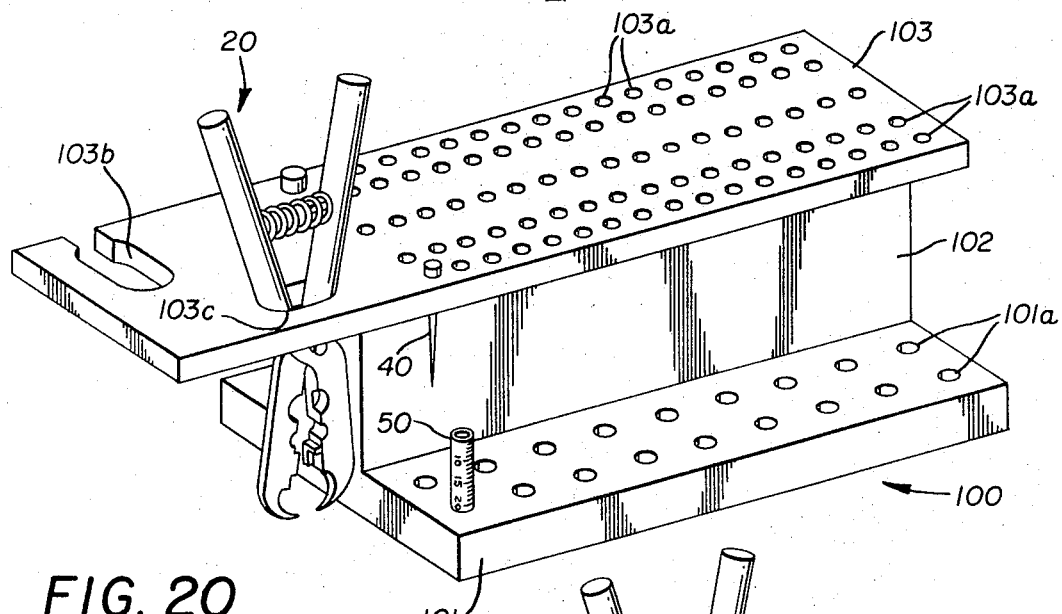
FIG. 20 is a perspective view of an instrument holder.
Figure 21:
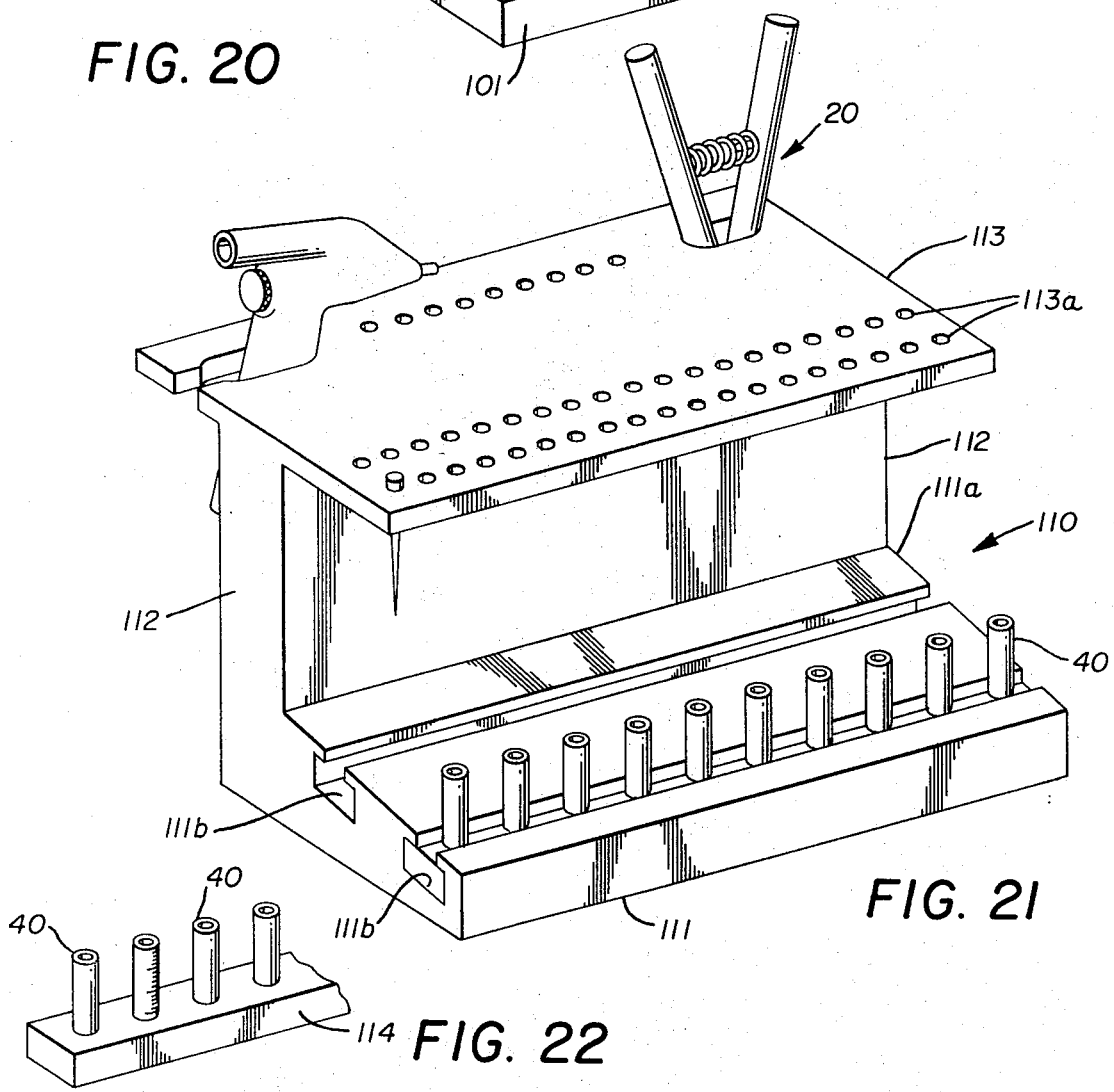
FIG. 21 is a perspective view of a modified form of instrument holder.

Turning next then to FIGS. 20 and 21 for a description of the various forms of assembly holders disclosed herein, and particularly referring first to FIG. 20, it will be noted that the assembly holder, generally designated by the numeral 100, includes a base 101, a projecting top pedestal 102, and a top cross member 103.

The base 101 has a series of apertures 101a therein, and these are intended to receive a supply of the measurement sleeves 50, 50 referred to above as well as a supply of sleeves 13, 13a.

The top piece 103 has a series of through apertures 103a, 103a which are intended to receive a supply of the working instruments 40, 140 and measurement wires 11, 11a.

Also includes in the top cross member 103 is a notched out aarea 103b which is intended to receive an irrigating and evacuation syringe.

An additional through opening 103c is provided in the top of the assembly holder 100 to receive the pliers or forceps referred to above.

Figure 22:
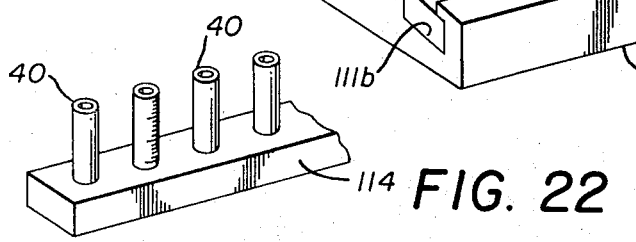
FIG. 22 is a partial perspective view showing the prepared measurement sleeve.

Referring next to FIGS. 21 and 22, a different version of the assembly holder is disclosed and is generally indicated by the numeral 110.

Basically this form of the holder has a base 111 and an upright pedestal 112 with a corresponding top piece 113.

This form of the invention is similar to the form shown in FIG. 13 in general in that the top member 113 has provision for the irrigating syringe and the pliers. It also has a series of through apertures 113a for storage of the operating or working instruments as well as the measurement wires if desired.

In this form of the invention the top surface 111a of the base 111 is shown tapered or sloping from its point of connection with the upright pedestal 112. Two dovetail grooves are cut into the face 111a of the base 111, and these grooves are generally indicated at 111b. The slot is intended to receive a pre-assembled molded member 114 which carries on it a plurality of sleeves 40, 40. The molded piece is slid into one of the slots 111b, and when it is desired to utilize one of the sleeves, they can merely be snapped off the unit 114. The sloping or tapering of top surface 111a facilitates this breaking movement.

While no particular materials have been set forth in the foregoing description, it should be understood that the sleeves which are utilized with either the measuring instrument or the working instrument would probably be of plastic or some other readily deformable material which would permit the crimping or deformation necessary to secure the sleeve to the instrument.

Similarly, with regard to the assembly holders 100, 110, the material is optional although it would preferably be of a material which could withstand a sterilization process.

While a full and complete description of the invention has been set forth in accordance with the dictates of the Patent Statutes, it is to be understood that modifications can be resorted to without departing from the spirit hereof or the scope of the appended claims.

I claim:

1. An endodontic measurement and operating system for root canal work comprising;
    A. an elongate flexible measurement instrument having a handle portion and a shank portion, with said shank portion being adapted to be inserted into said root canal;
    B. an elongate, hollow, deformable, cylindrical sleeve having first and second ends telescopically received on and secured to the projecting handle portion of said instrument by crimping it thereto with said first end thereof abutting the crown of the tooth;
    C. forceps means having compression grooves in the jaws thereof for deforming and securing said sleeve to said handle portion of said measurement instrument
        1. whereby the distance said shank of said instrument projects from said first end of said sleeve can be determined; and
    D. means for measuring the depth of penetration of said measurement instrument.

2. The system of claim 1 wherein said shank has a smooth tapering periphery.

3. The system of claim 1 wherein said shank has a plurality of regularly spaced annular grooves on its periphery.

4. The system of claim 1 wherein said forceps means also include cutting pockets in the jaws thereof.

5. The system of claim 1 wherein said forceps means also include slitting means in the jaws thereof.

6. The system of claim 1 wherein said forceps means include means for electrically fusing said sleeve to said measurement instrument.

7. The system of claim 1 further characterized by the presence of
    A. an elongate working instrument having handle and shank portions;
    B. an elongate hollow, deformable sleeve having first and second ends telescopically received on the handle portion of said working instrument; and
    C. forceps means having compression grooves in the jaws thereof for deforming and securing said sleeve to said handle portion of said working instrument at a predetermined axial location, with said shank of said working instrument projecting from said first end thereof a distance equal to the depth of penetration established by said measurement instrument.

8. The system of claim 7 wherein said sleeve has a plain peripheral surface.

9. The system of claim 7 wherein said sleeve is transparent and has a series of regularly spaced indicia on its periphery.

10. The system of claim 7 wherein said forceps means include means for electrically fusing said sleeve to said working instrument.

11. The system of claim 7 further characterized by the presence of
   A. locating means including
      1. a holder adapted to receive said sleeve and said working instrument;
      2. an adjustable measurement member movable relatively of said holder
         a. whereby the distance therebetween may be set to correspond to the depth of penetration established by said measurement instrument.

12. The system of claim 11 further characterized by the fact that said forceps means is carried by said locating means adjacent said holder.

13. The device of claim 11 further characterized by the presence of compression means interconnecting said first ends of said arms.

14. The device of claim 11 further characterized by the presence of means for heating said second ends of said arms.

* * * * *